United States Patent
Hanif et al.

(10) Patent No.: US 7,324,451 B2
(45) Date of Patent: Jan. 29, 2008

(54) AGGREGATED EARLY MESSAGE DISCARD FOR SEGMENTED MESSAGE TRAFFIC IN A COMMUNICATIONS NETWORK

(75) Inventors: Asad Fowad Hanif, Ottawa (CA); Ronald Jeffery, Ottawa (CA)

(73) Assignee: Alcatel, Paris (FR)

( * ) Notice: Subject to any disclaimer, the term of this patent is extended or adjusted under 35 U.S.C. 154(b) by 824 days.

(21) Appl. No.: 10/696,033

(22) Filed: Oct. 30, 2003

(65) Prior Publication Data

US 2005/0094668 A1   May 5, 2005

(51) Int. Cl.
   *H04L 12/26* (2006.01)
(52) U.S. Cl. .................................... 370/235; 370/236
(58) Field of Classification Search ............... 370/235, 370/236
   See application file for complete search history.

(56) References Cited

U.S. PATENT DOCUMENTS

| | | | |
|---|---|---|---|
| 5,689,499 A | 11/1997 | Hullett et al. ............... | 370/235 |
| 6,282,171 B1* | 8/2001 | Adams et al. .............. | 370/229 |
| 6,618,382 B1* | 9/2003 | Divivier et al. .......... | 370/395.5 |
| 6,625,120 B1* | 9/2003 | Pillar et al. ................. | 370/230 |
| 6,754,206 B1* | 6/2004 | Nattkemper et al. ........ | 370/369 |

OTHER PUBLICATIONS

ATM Forum Traffic Management Specification, Version 4.0, Document No. af-tm-0056.000, published by the ATM Forum in Apr. 1996 (pp. 1-99).
"Traffic Control and Congestion Control in B-ISDN," ITU-T Recommendation I.371, published by the International Telecommunications Union—Telecommunications (ITU-T) in Mar. 1993.
B-ISDN ATM Adaptation Layer (AAL) Specification, ITU-T Recommendation I.363, published by the International Telecommunications Union—Telecommunications (ITU-T) in Mar. 1993 (pp. 1-96).

* cited by examiner

*Primary Examiner*—Melvin Marcelo
(74) *Attorney, Agent, or Firm*—Jim Zegeer

(57) ABSTRACT

A method and device for message discard of segmented message traffic in an aggregated message traffic stream of a communications network. The aggregated traffic stream has constituent traffic streams and each constituent traffic stream has segmented message traffic made up of formative segmented message units. An indication of whether a currently received segmented message unit of each constituent traffic stream is to be subjected to discard is stored in a memory. Upon each arrival of a segmented message unit, a detection is made by way of a reader as to whether a currently received segmented message unit denotes a delineation between two segmented messages. A determination of whether a current condition of traffic congestion exists is also made, and a processor utilizes the stored indication, the detection and the determination in arriving at whether a next to be received segmented message unit of the constituent message traffic stream is to be subjected to message discard.

21 Claims, 4 Drawing Sheets

US 7,324,451 B2

AGGREGATED EARLY MESSAGE DISCARD FOR SEGMENTED MESSAGE TRAFFIC IN A COMMUNICATIONS NETWORK

FIELD OF THE INVENTION

The present invention relates generally to the field of communications and more particularly, to a method of message discard for segmented message traffic in an aggregated message traffic stream of a communications network.

BACKGROUND OF THE INVENTION

Segmented message traffic occurs in communications networks whenever traffic messages are divided into shorter length message segments or segmented message units. For instance, traffic messages in the form of variable-length packets such as Internet Protocol ("IP") packets or Frame Relay ("FR") frames are oftentimes segmented into fixed-length message segments such as Asynchronous Transfer Mode ("ATM") cells. This may take place, by way of example, in network architectures for which traffic conforming to variable-length message protocols is transported over a network backbone or other trunking network space that employs a fixed-length message protocol. As used and understood herein, message traffic is broadly intended to comprise all forms of network traffic such as cells, packets, frames or other units of transmission, whatever the format, function or content thereof.

Where the transmission of segmented message traffic is subject to traffic congestion, various known techniques of message discard have developed for assisting with congestion recovery. For example, traffic management standards as known to those in this art have specified numerous methods of intelligent message discard for segmented traffic. One such example is to discard segmented traffic upon the occurrence of congestion at the level of the non-segmented messages rather than at that of the constituent segmented message units, as set out in the ATM Forum Traffic Management Specification, Version 4.0, document number af-tm-0056.00, published by the ATM Forum in April 1996 (hereafter the "ATM Traffic Management Specification"). Another example of same is as set out in Recommendation I.371, Traffic Control and Congestion Control in B-ISDN, published by the International Telecommunications Union-Telecommunications (ITU-T) in March 1993 (hereafter the "ITU-T B-ISDN Traffic Control Specification"). In the case of FR traffic over ATM, the reaction to congestion according to this approach is to discard traffic at the frame level rather than at the cell level.

More specifically, it has been known in the art of communications networks to apply certain techniques of early message discard to segmented message traffic as a means of achieving traffic management. Thus, a network device that operates according to a technique of early message discard will, when in a congested state, reserve its buffer capacity for segmented message units which form part of segmented messages already admitted therein. Any orphaned segmented message units forming part of an incomplete message will therefore not be transmitted downstream of the congestion. Thus, the object of early message discard is to reject complete non-segmented messages once congestion is encountered. This precludes such orphaned segmented message units from unnecessarily utilizing downstream network resources, thereby maintaining good network throughput. An example of this type of early message discard known to those in this art is the Early Packet Discard ("EPD") technique as defined in the ATM Traffic Management Specification. The known EPD technique operates at the level of Protocol Data Units ("PDUs") pursuant to ATM Adaptation Layer 5 ("AAL5"), all as defined in Recommendation 1.363, B-ISDN ATM Adaptation Layer (AAL) Specification, published by the International Telecommunications Union-Telecommunications (ITU-T) in March 1993 (hereafter the "ITU-T ATM AAL Specification").

Although it is known to configure EPD techniques in respect of a given discrete traffic stream such as at the level of a virtual connection ("VC"), in many network topologies such discrete traffic streams are associated with an aggregated traffic stream of which they form a constituent part. For instance, an aggregated traffic stream of the foregoing kind may be configured as a virtual path ("VP"). In these circumstances, it would be desirable to enable message discard techniques at the level of a frame or packet on the constituent VCs of each VP. However, known techniques of message discard that are applicable to VP traffic do not typically discriminate as to the constituent VC traffic forming part of the aggregated VP traffic. This is problematic in that cells or frames may improperly be delineated and discarded indiscriminately within the aggregated VP traffic stream by operation of such prior art message discard techniques, thereby causing AAL5 frame corruption within one or more constituent VC traffic streams.

It has been known in the art to implement Early Packet Discard techniques at a per-VC level by individually configuring Early Packet Discard capability for each VC of a VP. However, this known practice is associated with the disadvantage of requiring the implementation of an Early Packet Discard algorithm typically for each and every constituent VC of a VP, which can number in the tens of thousands or more. There is therefore a need for an apparatus and method that would achieve early message discard for segmented message traffic in an aggregated manner while retaining the ability to discriminate as to constituent message traffic streams.

SUMMARY OF THE INVENTION

According to a first broad aspect of the present invention, there is provided a method of message discard for segmented message traffic in an aggregated message traffic stream of a communications network, the aggregated message traffic stream comprising a plurality of constituent message traffic streams thereof, each constituent message traffic stream having segmented message traffic which comprises segmented messages composed of formative segmented message units thereof, the said method comprising the steps of: (a) maintaining, for each said constituent message traffic stream, an indication of whether a currently received segmented message unit of each said constituent message traffic stream is to be subjected to message discard; (b) determining, upon each arrival of a segmented message unit of the aggregated message traffic stream, whether a currently received segmented message unit of the constituent message traffic stream denotes a delineation between two segmented messages thereof; (c) determining whether a current condition of traffic congestion exists as to the aggregated message traffic stream; and (d) utilizing the indication of step (a), the determination of step (b) and the determination of step (c) in determining whether a next to be received segmented message unit of the constituent message traffic stream is to be subjected to message discard.

According to a second broad aspect of the present invention, there is provided an apparatus for message discard of segmented message traffic in an aggregated message traffic stream of a communications network, the aggregated message traffic stream comprising a plurality of constituent message traffic streams thereof, each constituent message traffic stream having segmented message traffic which comprises segmented messages composed of formative segmented message units thereof, the said apparatus comprising: (a) a memory for storing, for each constituent message traffic stream, an indication of whether a currently received segmented message unit of each said constituent message traffic stream is to be subjected to message discard; (b) a reader for detecting, upon each arrival of a segmented message unit of the constituent message traffic stream, whether a currently received message unit of the constituent message traffic stream denotes a delineation between two segmented messages thereof; and (c) a processor for determining whether a next to be received segmented message unit of the constituent message traffic stream is to be subjected to message discard, wherein to arrive at the said determination of whether said next to be received segmented message unit is to be subjected to message discard, the processor utilizes the said indication of whether said currently received segmented message unit is to be subjected to message discard, the said detection of whether the said currently received segmented message unit denotes a delineation between said two segmented messages, and a determination of whether a current condition of traffic congestion exists as to the aggregated message traffic stream.

BRIEF DESCRIPTION OF THE DRAWINGS

By way of illustration and not of limitation, embodiments of the invention are next described with reference to the following drawings in which.

DETAILED DESCRIPTION OF EMBODIMENTS OF THE INVENTION

Figure 1:
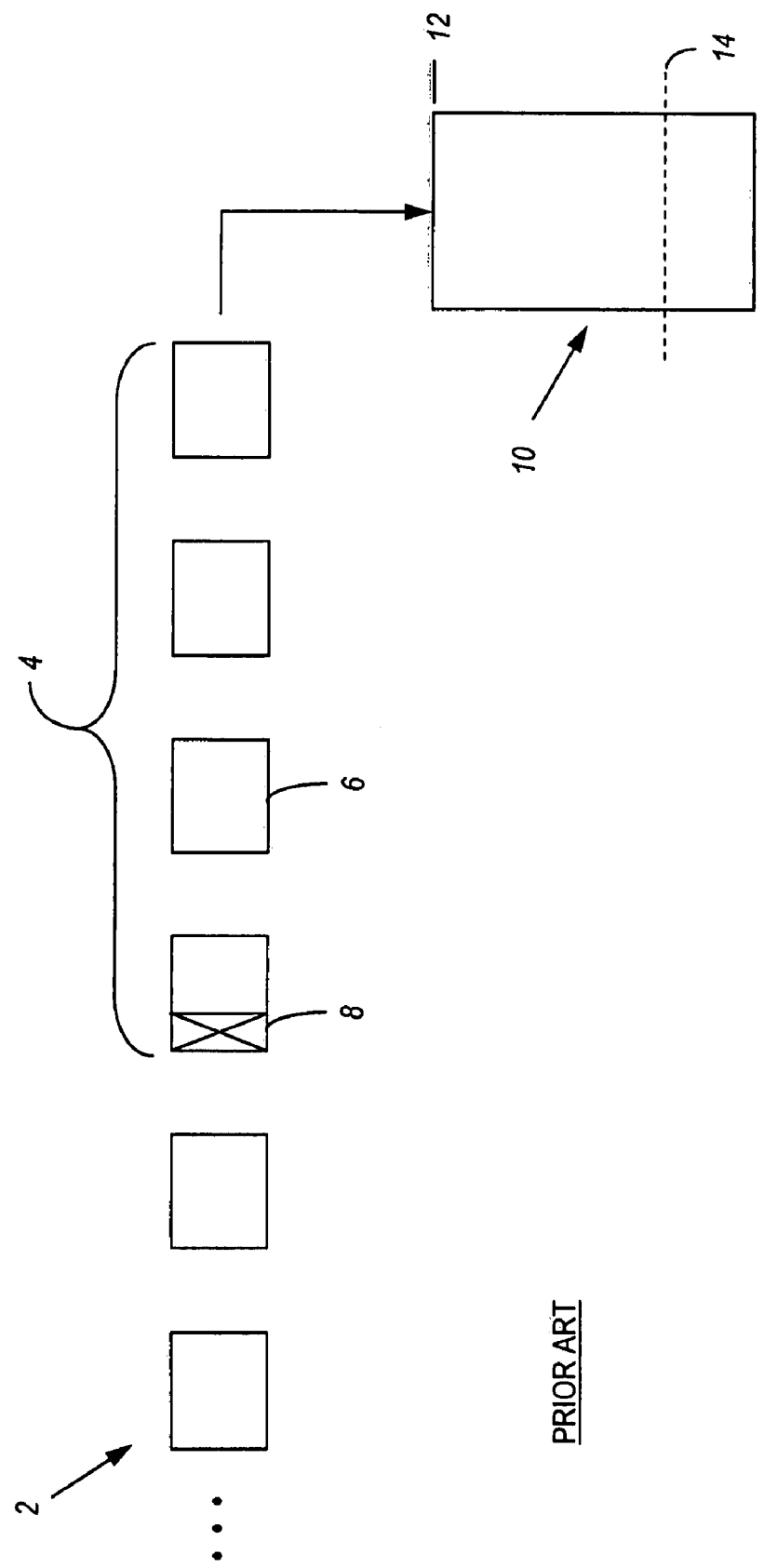
FIG. 1 depicts the operation of known Early Packet Discard techniques in the context of an AAL5 packet stream that is not aggregated or hierarchically multiplexed.

With reference to FIG. 1, a message traffic stream 2 consisting of AAL5 packets collectively denoted 4 is depicted in a serialized representation of segmented message units in the form of AAL5 cells 6. In the particular example of FIG. 1, the message traffic stream 2 is not aggregated or hierarchically multiplexed, in that the AAL5 cells 6 thereof all pertain to a single originating message traffic stream. For instance, the cells 6 of FIG. 1 may all form part of the same VC. As known to those skilled in this art, each AAL5 packet as at 4 may be mapped externally of the ATM Adaptation Layer to any higher-order communications protocol, such as Frame Relay, IP or ATM by way of example.

An AAL5 packet 4 may be delineated by means of an end-of-message indicator, for instance an End-of-Packet ("EOP") indicator 8. As may be expected, the message traffic stream 2 may encounter traffic congestion during its transmission, storage or other processing. For purposes of traffic management, the AAL5 cells 6 may be buffered in a queue 10 or the like as known to those in this art. Such a queue 10 will be associated with a hard queue depth limit 12 that denotes the maximum storage capacity thereof. For purposes of applying a known intelligent message discard algorithm such as the EPD techniques discussed previously, the queue 10 will also be associated with a message discard congestion threshold. This threshold for queue 10 is depicted as an EPD congestion threshold 14, such that once the current queue depth of queue 10 exceeds this threshold, Early Packet Discard will be executed in respect of the message traffic stream 2. For instance, the operation of known Early Packet Discard techniques would therefore permit the constituent cells 6 of a currently processed AAL5 packet 4 to traverse the queue 10, but thereafter all other AAL5 packets and their respective constituent cells would be discarded as complete and integral packets until such time as the current queue depth of queue 10 returns to a position below that of EPD congestion threshold 14.

Figure 2:
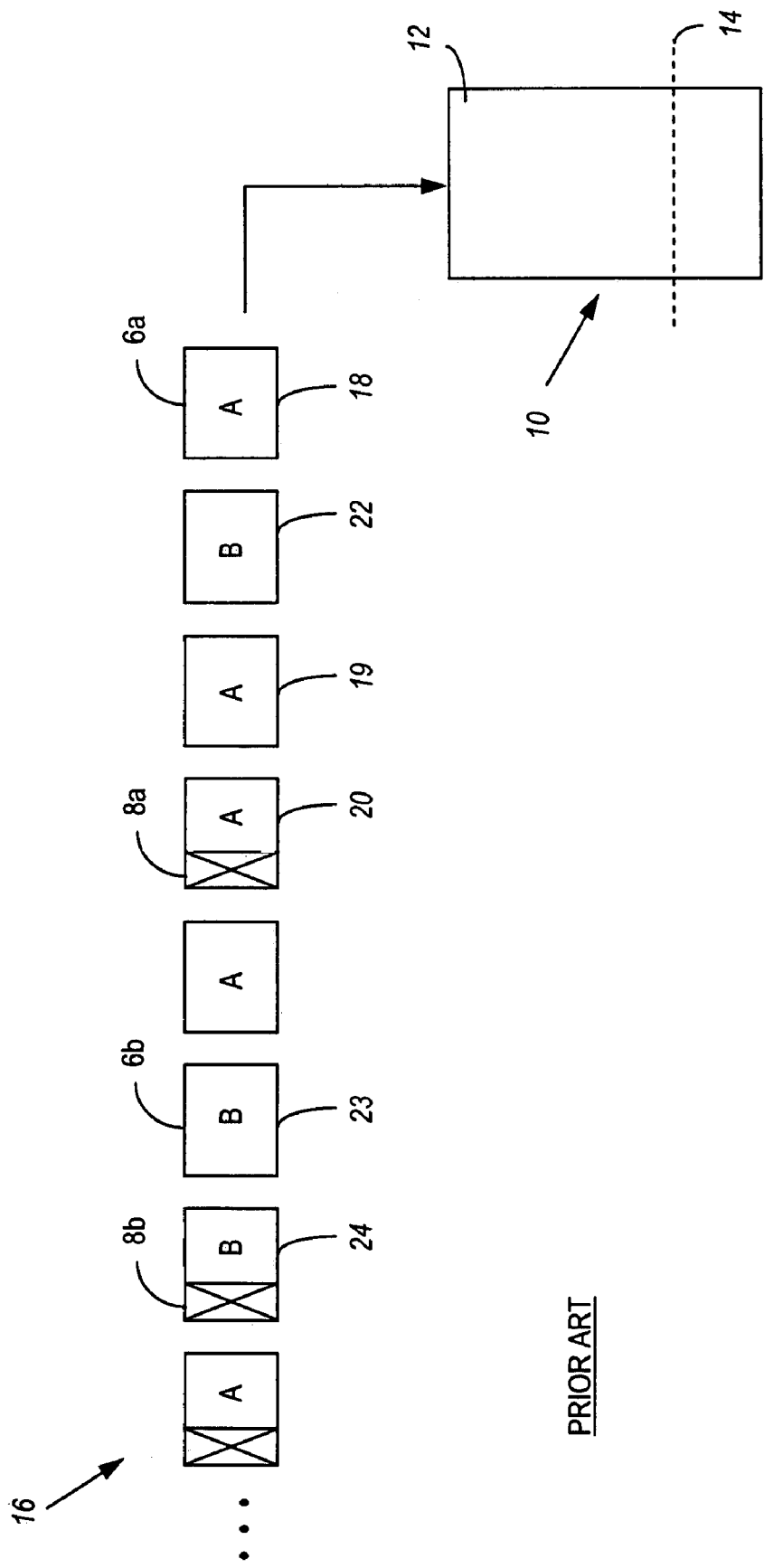
FIG. 2 depicts the operation of known Early Packet Discard techniques to an AAL5 traffic stream that is aggregated or hierarchically multiplexed.

Turning to FIG. 2, there is depicted yet another serialized representation of segmented message units in the form of AAL5 cells 6. In this example, a message traffic stream 16 is now aggregated or hierarchically multiplexed, in that the constituent AAL5 cells 6 thereof do not pertain to a single originating message traffic stream. More particularly, the cells 6 may represent cells forming part of the same VP, but the message traffic stream 16 contains constituent cells originating from different VCs thereof. By way of example, the cells 6a denoted "A" may all form part of VC, and the cells 6b denoted "B" may all form part of $VC_2$ which is separate and distinct from $VC_1$. As with the example depicted in FIG. 1, each AAL5 packet of the message traffic stream 16 may be delineated from one another by means of an end-of-message indicator such as the End-of-Packet ("EOP") indicator 8, denoted 8a in the case of the cells 6a of $VC_1$ and denoted 8b in the case of the cells 6b of $VC_2$.

If known techniques of Early Packet Discard are applied to the aggregated or hierarchically multiplexed message traffic stream 16 of FIG. 2 upon the current queue depth of queue 10 having exceeded its EPD congestion threshold 14, the constituent cells 6a and 6b of distinct VCs may be inappropriately discarded. For example, the application of known EPD techniques to message traffic stream 16 at the particular point in time depicted in FIG. 2 would result in the continued acceptance into queue 10 of the specific cells 18, 19, 20 of VC, and the specific cell 22 of $VC_2$. No further sequential cell of $VC_1$ subsequent to the specific cell 20 would be admitted into the queue 10, given that the cell 20 contains the EOP indicator 8a which delineates an AAL5 packet of $VC_1$. However, given that the known EPD techniques do not discriminate as to constituent VCs of a VP when applied to aggregated or hierarchically multiplexed traffic, the specific cells 23, 24 of $VC_2$ would likewise be denied admittance into the queue 10 by reason of the fact that these cells of $VC_2$ are sequentially subsequent to the cell 20 of $VC_1$ that served to delineate an AAL5 packet thereof. Thus, it can readily be appreciated that an inappropriate discard of the cells 23, 24 would result in the example of FIG. 2, since the specific cell 22 of $VC_2$ has already been admitted into queue 10. Cell 22 would thereafter be transmitted downstream of queue 10, orphaned from the other specific cells 23, 24 of $VC_2$ that form a distinct AAL5 packet.

Figure 3:
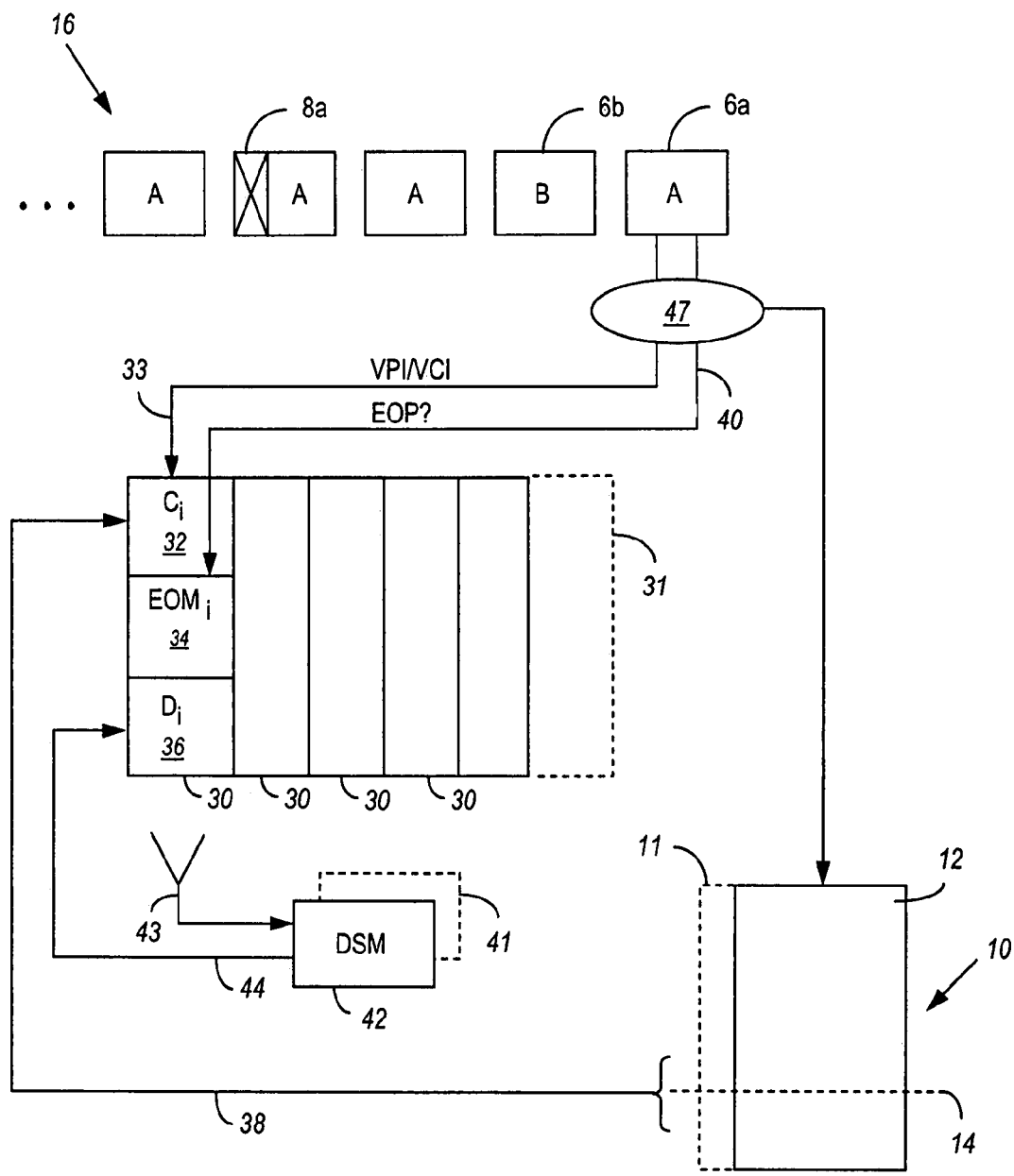
FIG. 3 depicts the operation of the method of message discard according to a first embodiment of the present invention, together with an apparatus for effecting same.

According to an embodiment of the present invention, and with reference to FIG. 3 and following, a discard state table 30 is configured for each constituent stream of an aggregated traffic stream such as the message traffic stream 16. In the particular example of the message traffic stream 16, a discard state table 30 is configured for each VC of every VP forming part of the message traffic thereof. The discard state table 30 may be provisioned in a memory 31 or the like. As explained in further detail below, each discard state table 30 may reflect, on a cell-by-cell basis, three parameters pertaining to the particular constituent traffic stream for which the discard state table 30 is configured. Namely, these three parameters are a congestion indication 32 ("$C_i$"), an end-of-message indication 34 ("$EOM_i$") and a discard state indication 36 ("$D_i$"). The congestion indication 32 ("$C_i$") may be used to indicate a buffer overrun condition for the aggregated traffic stream as a whole, such as denoting that the EPD congestion threshold 14 of queue 10 of the earlier examples has been exceeded. For instance, a bit value of zero for congestion indication 32 may be used to denote no congestion, whereas a bit value of 1 may instead be used to indicate the presence of congestion. The end-of-message indication 34 ("$EOM_i$") may be used to denote whether or not an end-of-message indicator, such as an EOP indicator 8a or 8b, has been encountered for the particular constituent traffic stream, for instance the $VC_1$ or $VC_2$ traffic stream discussed earlier. By way of example, a bit value of zero for end-of-message indication 34 ("$EOM_i$") may be used to denote that no EOP indicator 8 has been detected for a current cell 6a or 6b of the aggregated traffic stream, whereas a bit value of 1 may instead be used to denote the detection of an EOP indicator. Lastly, the discard state indication 36 ("$D_i$") may be utilized to inform that a current cell 6a or 6b of the aggregated traffic stream is to be discarded. For instance, a bit value of zero for discard state indication 36 ("$D_i$") may denote that the current cell 6a or 6b is not to be discarded, whereas a bit value of 1 may instead be used to indicate that such cell is to be discarded.

Values of the parameters of the discard state table 30 may be updated with each current cell arrival 6a or 6b. The appropriate location within discard state table 30 of the relevant parameters pertaining to each current cell 6a or 6b is determined by reading as at 33 addressing information in respect of the current cell, such as VPI and VCI values thereof. The congestion indication 32 ("$C_i$") is updated as at 38 to reflect the current buffer overrun condition of queue 10 as previously described. Queue 10 may be provisioned in a memory 11 or the like. The end-of-message indication 34 ("$EOM_i$") is updated as at 40 from a determination as to whether the current cell 6a or 6b possesses, encapsulates or otherwise reveals an EOP indicator 8a or 8b, as the case may be. The addressing information in respect of the current cell, together with the end-of-message indication 34 ("$EOM_i$"), may be obtained from each cell arrival 6a or 6b by means of a reader 47 or the like. The discard state indication 36 ("$D_i$"), the congestion indication 32 ("$C_i$") and end-of-message indication 34 ("$EOM_i$") are provided as at 43 on each current cell arrival 6a or 6b to a discard state machine 42 ("DSM") or the like. Discard state machine 42 is utilized to determine whether or not each current cell arrival 6a or 6b is to be discarded, according to the method described in greater detail below. The discard state machine 42 may then itself update the value of the discard state indication 36 ("$D_i$"), as at 44.

As will be appreciated by those skilled in this art, the discard state machine 42 may be implemented in hardware, software or a combination thereof. Discard state machine 42 may be operated by means of instructions executing on a processor 41 or the like. Alternatively, discard state machine 42 may be provisioned by means of hardware logic, as is well known to those in this art. The operation of the discard state machine 42 is described with reference to Table "A" in terms of a state transition table. Given the three parameters of the discard state table 30 discussed previously, and the single-bit values each may assume, there is a potential for eight combinations of bit values which have been identified as Examples (a) through (h) in the state transition table of Table "A", as follows:

TABLE A

STATE TRANSITION TABLE

| Example | $C_i$ | $EOM_i$ | $D_i$ | $D_i$ (New) | Operation |
|---------|-------|---------|-------|-------------|-----------|
| (a) | 0 | 0 | 0 | 0 | PASS |
| (b) | 0 | 0 | 1 | 1 | DISCARD |
| (c) | 0 | 1 | 1 | 0 | DISCARD |
| (d) | 0 | 1 | 0 | 0 | PASS |
| (e) | 1 | 0 | 0 | 0 | PASS |
| (f) | 1 | 0 | 1 | 1 | DISCARD |
| (g) | 1 | 1 | 0 | 1 | PASS |
| (h) | 1 | 1 | 1 | 1 | DISCARD |

Each of the Examples (a) through (h) of Table "A" is discussed in turn herebelow. When the discard state machine 42 is initialized, the discard state indication 36 ("$D_i$") for each constituent traffic stream is set to a default value of zero, corresponding to an indication that the currently received cell 6a or 6b is not to be subjected to discard. The respective values of the congestion indication 32 ("$C_i$") and end-of-message indication 34 ("$EOM_i$") are obtained on a cell-by-cell basis as described previously, namely from the current cell arrival 6a or 6b and from the buffer overrun condition of the queue 10.

Examples (a) through (d) of Table "A" all pertain to a situation where there is no congestion as determined from an absence of a buffer overrun condition in respect of queue 10. Example (a) of Table "A" has parameter values of discard state table 30 which correspond to no congestion, no end-of-packet detection and a discard state indication 36 ("$D_i$") having a value of zero. In this situation, the discard state machine 42 returns a value to the effect that the current cell arrival 6a or 6b is not to be discarded but is to be passed. The discard state machine 42 does not change the value of the discard state indication 36 ("$D_i$") of the discard state table 30, as shown by the value of $D_i$ (New) in Table "A", which remains at a value of zero. Example (b) of Table "A" has corresponding parameters denoting no congestion, no end-of-packet detection and a discard state indication 36 ("$D_i$") having a value of 1. In this situation, the discard state machine 42 returns a value to the effect that the current cell arrival is to be discarded and is not to be passed. The discard state machine 42 does not change the value of the discard state indication 36 ("$D_i$") of the discard state table 30, as shown by the value of $D_i$ (New) in Table "A", which remains at a value of 1. Examples (a) and (b) of Table "A" therefore relate to situations of traffic flow where current cell arrivals 6a or 6b of a given packet are either passed or discarded, and the discard state machine 42 seeks to maintain the same state of affairs of either passing or discarding, as the case may be, until such time as an end-of-packet detection is made.

In Example (c) of the Table "A", the corresponding parameters denote no congestion, an end-of-packet detection and a discard state indication 36 ("$D_i$") having a value of 1. In this situation, the discard state machine 42 returns a value to the effect that the current cell arrival is to be discarded and is not to be passed. In this instance, the discard state machine 42 does proceed to change the value of the discard state indication 36 ("$D_i$") of the discard state table 30, as shown by the value of $D_i$ (New) in Table "A", which is changed to a value of zero. This signifies that the discard state machine 42 has encountered a current cell arrival 6a or 6b which is to be discarded, and the fact that the current cell in question delineates a packet signifies that the discard state indication 36 ("$D_i$") is to be reset to its default value of zero in a context of no congestion. In Example (d) of Table "A", the corresponding parameters denote a situation of no congestion, an end-of-packet detection and a discard state indication 36 ("$D_i$") having a value of zero. In this context, the discard state machine 42 returns a value to the effect that the current cell arrival is to be passed and is not to be discarded. The discard state machine 42 does not change the value of the discard state indication 36 ("$D_i$") of the discard state table 30, as shown by the value of $D_i$ (New) in Table "A", which remains at a value of zero. This example signifies that current cell arrivals 6a or 6b associated with a given packet are being passed, and the fact that the current cell in question delineates a packet signifies that the next cell arrival is likewise to be passed absent a condition of congestion. The discard state indication 36 ("$D_i$") therefore retains its default value of zero.

Each of the examples (e) through (h) of Table "A" relate to the situation where congestion is detected in respect of queue 10 as previously described. Thus, in Example (e) the relevant parameters signify a condition of congestion, no end-of-packet detection and a discard state indication 36 ("$D_i$") having a value of zero. In this situation, the discard state machine 42 returns a value to the effect that the current cell arrival is to be passed and is not to be discarded. The discard state machine 42 does not change the value of the discard state indication 36 ("$D_i$") of the discard state table 30, as shown by the value of $D_i$ (New) in Table "A", which remains at a value of zero. This situation signifies that current cell arrivals 6a or 6b are passed and next to be received cells are to continue to be passed for a given packet, notwithstanding a condition of congestion. Since an end-of-packet detection is not made, the discard state indication 36 ("$D_i$") retains its default value of zero. In Example (f) of Table "A", the corresponding parameters in question denote a condition of congestion, no end-of-packet detection and a discard state indication 36 ("$D_i$") having a value of 1. In this situation, the discard state machine 42 returns a value to the effect that the current cell arrival is to be discarded and is not to be passed. The discard state machine 42 does not change the value of the discard state indication 36 ("$D_i$") of the discard state table 30, as shown by the value of $D_i$ (New) in Table "A", which remains at a value of 1. This situation signifies that in a condition of congestion, next to be received cell arrivals belonging to a given packet are to be discarded if current cell arrivals were likewise being discarded. Since an end-of-packet detection is not made, the discard state indication 36 ("$D_i$") retains its existing value of 1. Each of Examples (e) and (f) of Table "A" is therefore analogous to the Examples (a) and (b) thereof, in that an existing situation of passing or discarding is sought to be maintained by the discard state machine 42.

In Example (g) of Table "A", the corresponding parameters in question denote a condition of congestion in respect of queue 10, an end-of-packet detection and a discard state indication 36 ("$D_i$") having a value of zero. In this situation, the discard state machine 42 returns a value to the effect that the current cell arrival is to be passed and is not to be discarded. The discard state machine 42 then proceeds to change the value of the discard state indication 36 ("$D_i$") of the discard state table 30, as shown by the value of $D_i$ (New) in Table "A", which is changed to a value of 1. This signifies that in the context of a condition of congestion, next to be received cell arrivals 6a or 6b belonging to a different packet than currently passed cell arrivals will be subject to discard. In Example (h) of Table "A", the corresponding parameters in question denote a condition of congestion, an end-of-packet detection and a discard state indication 36 ("$D_i$") having a value of 1. In this situation, the discard state machine 42 returns a value to the effect that the current cell arrival is to be discarded and is not to be passed. The discard state machine 42 does not change the value of the discard state indication 36 ("$D_i$") of the discard state table 30, as shown by the value $D_i$ (New) in Table "A", which remains at a value of 1. This denotes that in the context of a condition of congestion, next to be received cell arrivals 6a or 6b that belong to a different packet than currently discarded cell arrivals 6a or 6b are also to be discarded. Although in this example an end-of-packet detection is made, the discard state indication 36 ("$D_i$") retains its existing value of 1 on account of the condition of congestion.

Figure 4:
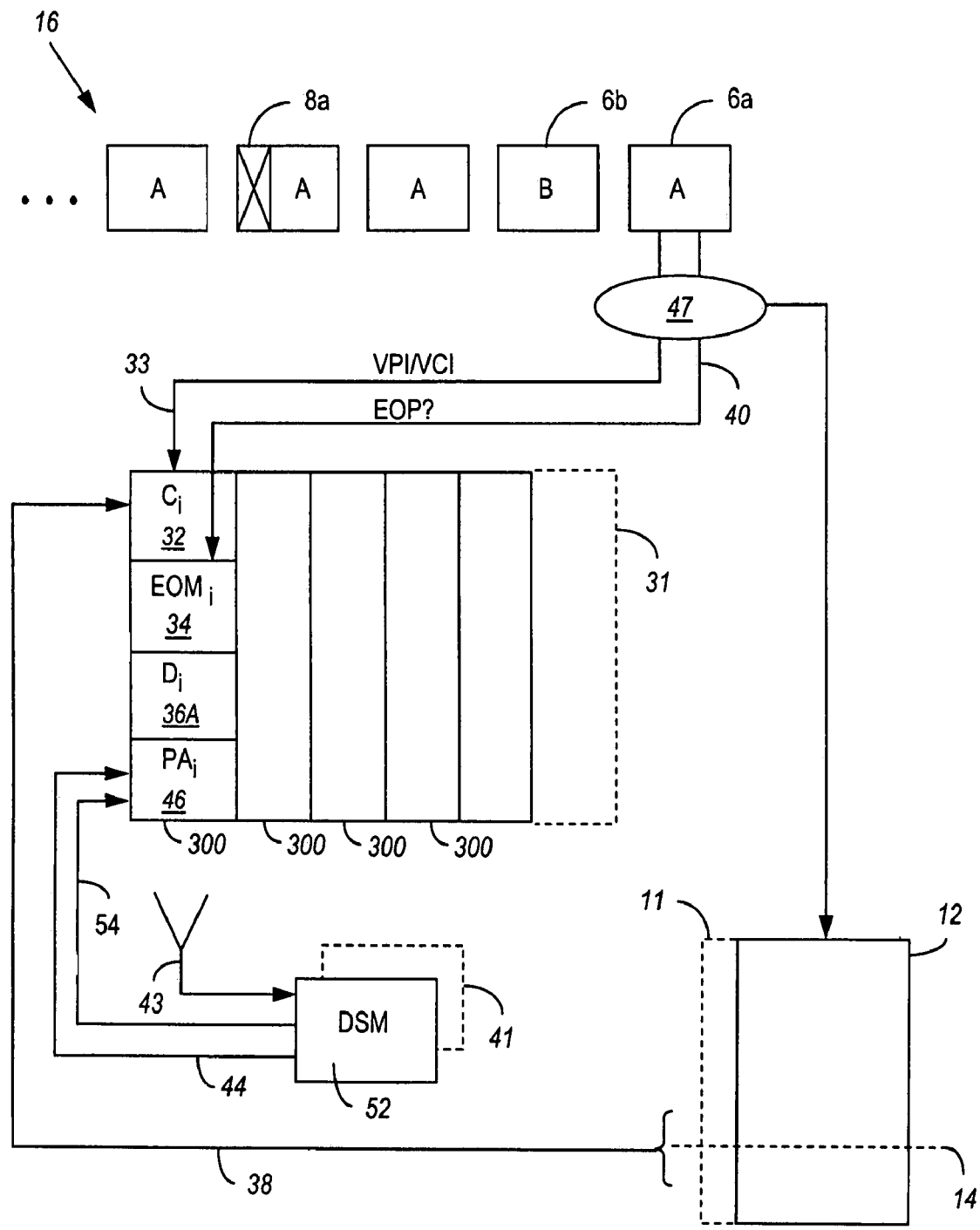
FIG. 4 depicts the operation of the method of message discard according to a second embodiment of the present invention, together with an apparatus for effecting same.

With reference now to FIG. 4, another embodiment of the present invention is next described, wherein a modified discard state table 300 is employed. As with the previously discussed discard state table 30, the discard state table 300 is configured for each VC of every VP forming part of the aggregated message traffic stream 16. As compared to the discard state table 30, the discard state table 300 includes an additional parameter that is reflected on a cell-by-cell basis, namely a packet activity indication 46 ("$PA_i$"). As well, the discard state table 300 uses a modified form of the discard state indication 36 ("$D_i$"), which is denoted in what follows as discard state indication 36A ("$D_i'$"). The packet activity indication 46 ("$PA_i$") denotes whether or not a particular packet of the aggregated message traffic stream 16 is currently active, in other words, whether a last received constituent cell 6a or 6b of the aggregated traffic stream 16 formed part of the same packet as a currently received constituent cell 6a or 6b. If so, this signifies that the packet in question is currently transmitting. By way of example, a bit value of zero for packet activity indication 46 ("$PA_i$") may be used to denote that the particular packet in question is not active and is not currently transmitting constituent cells as aforesaid, whereas a bit value of 1 may be used instead to denote that the said packet is currently transmitting and as such, cells 6a or 6b are being received in a packet mid-stream context.

The discard state indication 36A ("$D_i'$") in the case of discard state machine 52 no longer alone governs whether a current cell arrival 6a or 6b is to be subjected to message discard, as is the case with the discard state indication 36 ("$D_i$") of discard state machine 42. Instead, for discard state machine 52 two bits may be used numerically to denote whether a currently received cell arrival 6a or 6b is to be subjected to discard, with one bit constituting the discard state indication 36A ("$D_i'$") and the other bit constituting the packet activity indication 46 ("$PA_i$"). For instance, a current cell arrival 6a or 6b may be subjected to discard under any one of the following situations:

(a) bit values of 1 for both the discard state indication 36A ("$D_i'$") and the packet activity indication 46 ("$PA_i$"), regardless of whether or not a condition of congestion is detected;

(b) in a condition of congestion, bit values of zero for both the discard state indication 36A ("$D_i'$") and the packet activity indication 46 ("$PA_i$"); or (c) in a condition of congestion, a bit value of 1 for the discard state indication 36A ("$D_i'$"), regardless of the bit value of the packet activity indication 46 ("$PA_i$").

All other parameters maintained by means of discard state table 300 are as previously described for discard state table 30, namely the congestion indication 32 ("$C_i$") and the end-of-message indication 34 ("$EOM_i$"). As with the embodiment previously described, the discard state table 300 may be provisioned in a memory 31 or the like.

As with the state transition table 30, values of the parameters of the discard state table 300 may be updated with each current cell arrival 6a or 6b. The appropriate location within the discard state table 300 of the relevant parameters pertaining to each current cell 6a or 6b is determined by reading as at 33 addressing information in respect of the current cell, such as VPI and VCI values thereof. The congestion indication 32 is updated as at 38 to reflect the current buffer overrun condition of queue 10 as previously described in relation to discard state table 30. As discussed above, queue 10 may be provisioned in a memory 11 or the like. The end-of-message indication 34 ("$EOM_i$") is updated as at 40 from a determination as to whether the current cell 6a or 6b possesses, encapsulates or otherwise reveals an EOP indicator 8a or 8b, as the case may be. As with the embodiment previously described, a reader 47 or the like may be used to obtain the addressing information and end-of-message indication 34 ("$EOM_i$") from each cell arrival 6a or 6b. The discard state indication 36A ("$D_i'$"), together with the congestion indicator 32 ("$C_i$"), end-of-message indication 34 ("$EOM_i$") and packet activity indication 46 ("$PA_i$"), may be provided as at 43 on each current cell arrival 6a or 6b to a discard state machine 52 ("DSM'") or the like. As with the discard state machine 42 previously described, the discard state machine 52 is utilized to determine whether or not each current cell arrival 6a or 6b is to be discarded, according to the method described in greater detail below. The discard state machine 52 may then itself update the values of the discard state indication 36 ("$D_i$") and the packet activity indication 46 ("$PA_i$"), respectably as at 44 and 54.

As will be appreciated by those skilled in this art, the discard state machine 52 may be implemented in hardware, software or a combination thereof. For instance, discard state machine 52 may be operated by means of instructions executing on a processor 41 or the like. Alternatively, discard state machine 52 may be provisioned by means of hardware logic, as is well known to those in this art. The operation of the discard state machine 52 is described with reference to Table "B" in terms of a state transition table. Given the four parameters of the discard state table 300 discussed previously, and a single-bit value that each may assume, there is a potential for sixteen combinations of bit values which have been identified as examples (a) through (p) in the state transition table of Table "B", as follows:

TABLE B

STATE TRANSITION TABLE

| Example | $C_i$ | $EOM_i$ | $D_i'$ | $PA_i$ | $D_i'$ (New) | $PA_i$ (New) | Operation |
|---|---|---|---|---|---|---|---|
| (a) | 0 | 0 | 0 | 0 | 0 | 1 | PASS |
| (b) | 0 | 0 | 0 | 1 | 0 | 1 | PASS |
| (c) | 0 | 0 | 1 | 0 | 0 | 1 | PASS |
| (d) | 0 | 0 | 1 | 1 | 1 | 1 | DISCARD |
| (e) | 0 | 1 | 0 | 0 | 0 | 0 | PASS |
| (f) | 0 | 1 | 0 | 1 | 0 | 0 | PASS |
| (g) | 0 | 1 | 1 | 0 | 0 | 0 | PASS |
| (h) | 0 | 1 | 1 | 1 | 0 | 0 | DISCARD |
| (i) | 1 | 0 | 0 | 0 | 1 | 1 | DISCARD |
| (j) | 1 | 0 | 0 | 1 | 0 | 1 | PASS |
| (k) | 1 | 0 | 1 | 0 | 1 | 1 | DISCARD |
| (l) | 1 | 0 | 1 | 1 | 1 | 1 | DISCARD |
| (m) | 1 | 1 | 0 | 0 | 1 | 0 | DISCARD |
| (n) | 1 | 1 | 0 | 1 | 1 | 0 | PASS |
| (o) | 1 | 1 | 1 | 0 | 1 | 0 | DISCARD |
| (p) | 1 | 1 | 1 | 1 | 1 | 0 | DISCARD |

Each of the Examples (a) through (p) of Table "B" is discussed in turn herebelow. When the discard state machine 52 is initialized, the discard state indication 36A ("$D_i'$") and the packet activity indication 46 ("$PA_i$") for each constituent traffic stream are each set to a default value of zero. In the case of the discard state indication 36A ("$D_i'$"), this default value corresponds to an indication that the last received cell 6a or 6b was not subjected to discard. In the case of the packet activity indication 46 ("$PA_i$"), the default value corresponds to an indication that the current packet was not already transmitting constituent cells 6a or 6b, in that a last received constituent cell 6a or 6b does not form part of the same packet as the current packet. As is the situation in respect of the discard state table 30 discussed previously, the respective values of the congestion indication 32 ("$C_i$") and end-of-message indication 34 ("$EOM_i$") are obtained on a cell-by-cell basis, namely respectively from the buffer overrun condition of the queue 10 and from the current cell arrival 6a or 6b.

Examples (a) through (h) of Table "B" all pertain to a situation where there is no congestion, as determined from the absence of a buffer overrun condition in respect of the queue 10. In the case of Examples (a) through (d), no end-of-packet detection applies, whereas an end-of-packet detection is made in each of the Examples (e) through (h). Thus, in Example (a) the relevant parameters signify a condition of no congestion, no end-of-packet detection, a discard state indication 36A ("$D_i'$") having a value of zero and a packet activity indication 46 ("$PA_i$") also having a value of zero. In this situation, the discard state machine 52 returns a value to the effect that the current cell arrival 6a or 6b is to be passed and is not to be discarded. The discard state machine 52 does not change the value of the discard state indication 36A ("$D_i'$") of discard state table 300, as shown by the value of $D_i'$ (New) in Table "B", which remains at a value of zero. On the other hand, the discard state machine 52 does proceed to change the value of the packet activity indication 46 ("$PA_i$") of discard state table 300, as shown by the value of $PA_i$ (New) in Table "B", which is changed to a value of 1. This situation signifies, in the context of no congestion and no end-of-packet detection, that where no previous cells 6a or 6b forming part of the currently received packet have been received, the current cell arrival 6a or 6b is to be passed with a notation being made by means of the change in value of the packet activity indication 46 ("$PA_i$") that the current packet is now actively transmitting. In Example (b) of Table "B", the corresponding parameters in question are the same as for Example (a) of Table "B", with the exception that the packet activity indication 46 ("$PA_i$") has a value of 1 instead of zero. In this situation, the discard state machine 52 returns a value to the effect of the current cell arrival 6a or 6b is to be passed and is not to be discarded. The discard state machine 52 does not change the values of the discard state indication 36A ("$D_i'$") nor of the packet activity indication 46 ("$PA_i$") of discard state table 300, as shown by the values of $D_i'$ (New) and $PA_i$ (New), which remain at respective values of zero and 1. This situation signifies that a new cell arrival 6a or 6b, which forms part of a packet that is actively transmitting and for which previous cell arrivals were passed and not discarded, will continue to be passed and not discarded in the context of a condition of no congestion and no end-of-packet detection.

Each of Examples (c) and (d) of Table "B" have a discard state indication 36A ("$D_i$'") having a value of 1 and, as mentioned previously, with the other parameters thereof signifying a condition of no congestion and no end-of-packet detection. In the situation of Example (c), the packet activity indication 46 ("$PA_i$") has a value of zero. In this situation, the discard state machine 52 returns a value to the effect that the current cell arrival 6a or 6b is to be passed and is not to be discarded. The discard state machine 52 proceeds to change the value of the discard state indication 36A ("$D_i$'") of discard state table 300, as shown by the value of $D_i$' (New) in Table "B", which is changed to a value of zero. The discard state machine 52 also proceeds to change the value of the packet activity indication 46 ("$PA_i$") of discard state table 300, as shown by the value of $PA_i$ (New) in Table "B", which is changed to a value of 1. This situation signifies that in the context of a condition of no congestion and no end-of-packet detection, current cell arrivals 6a or 6b belonging to a newly transmitting packet will be passed notwithstanding that a previous packet had been subjected to discard. Given that a newly received packet is encountered in this example, the discard state indication 36A ("$D_i$'") is reset to its default value of zero but the packet activity indicator 46 ("$PA_i$") is changed to a value of 1 in order to denote an actively transmitting packet. In Example (d) of Table "B", the corresponding parameters in question are the same as for Example (c) of Table "B", with the exception that the packet activity indication 46 ("$PA_i$") has a value of 1 instead of zero. In this situation, the discard state machine 52 returns a value to the effect that the current cell arrival 6a or 6b is to be discarded and is not to be passed. The discard state machine 52 does not change the respective values of the discard state indication 36A ("$D_i$'") and of the packet activity indication 46 ("$PA_i$") of discard state table 300, as shown by the respective values of $D_i$' (New) and $PA_i$ (New) in Table "B", which each remain at a value of 1. This situation signifies that in the context of a condition of no congestion and no end-of-packet detection, current cell arrivals 6a or 6b that belong to a given actively transmitting packet are to be discarded if previous cell arrivals of the same packet were likewise being discarded.

As mentioned previously, Examples (e) through (h) of Table "B" all relate to situations of no congestion and for which an end-of-packet detection is made. In the case of Examples (e) and (f) of Table "B", the discard state indication 36A ("$D_i$'") has a value of zero, whereas in the cases of Examples (g) and (h), this same parameter has a value of 1. Thus, in Example (e) of Table "B" the corresponding parameters in question denote a condition of congestion in respect of queue 10, an end-of-packet detection, a discard state indication 36A ("$D_i$'") having a value of zero and a packet activity indication 46 ("$PA_i$") also having a value of zero. In this situation, the discard state machine 52 returns a value to the effect that the current cell arrival of 6a or 6b is to be passed and is not to be discarded. The discard state machine 52 does not proceed to change the values of the discard state indication 36A ("$D_i$'") and of the packet activity indication 46 ("$PA_i$") of discard state table 300, as shown by the values of $D_i$' (New) and $PA_i$ (New) in Table "B", which each retain their existing values of zero. Given that Example (e) of Table "B" speaks to a situation of an end-of-packet detection for which the current cell arrival 6a or 6b belongs to a newly received or newly transmitting packet, this particular situation therefore relates to the reception of a packet consisting of only a single cell. For this reason, packet activity indication 46 ("$PA_i$") is reset to its default value of zero. Thus, in the context of a condition of no congestion and of an end-of-packet detection, current cell arrivals 6a or 6b belonging to a single-cell packet will be permitted to pass. In Example (f) of Table "B", the corresponding parameters in question are the same as for Example (e) of Table "B", with the exception that the packet activity indication 46 ("$PA_i$") has a value of 1 instead of zero. In this situation, the discard state machine 52 returns a value to the effect that the current cell arrival 6a or 6b is to be passed and is not to be discarded. The discard state machine 52 does not change the value of the discard state indication 36A ("$D_i$'") of discard state table 300, as shown by the value $D_i$' (New) in Table "B", which remains at a value of zero. However, the discard state machine 42 does proceed to change the value of the packet activity indication 46 ("$PA_i$") of discard state table 300, as shown by the value $PA_i$ (New) in Table "B", which is changed to a value of zero. This denotes that in the context of a condition of no congestion and with an end-of-packet detection, constituent cells 6a or 6b will continue to be passed if such cells form part of the last to be received of the constituent cells of an active packet for which no cell discard has taken place. Given that the currently received cell 6a or 6b is the last to be received of the currently active packet, the packet activity indication 46 ("$PA_i$") is reset to its default value of zero.

In Examples (g) and (h) of Table "B", there are denoted situations of no condition of congestion, an end-of-packet detection and a discard state indication 36A ("$D_i$'") having a value of 1. In Example (g) of Table "B", the packet activity indication 46 ("$PA_i$") has a value of zero. In this situation, the discard state machine 52 returns a value to the effect that the current cell arrival 6a or 6b is to be passed and is not to be discarded. The discard state machine 52 then proceeds to change the value of the discard state indication 36A ("$D_i$'") of discard state table 300, as shown by the value of $D_i$' (New) in Table "B", which is changed to a value of zero. This signifies that in a context of a condition of no congestion and where an end-of-packet detection is made, a newly arrived constituent cell 6a or 6b that forms part of a newly arrived packet will be passed notwithstanding that previously received cells 6a or 6b belonging to another packet had been subjected to discard. Given that Example (g) speaks to a situation of an end-of-packet detection but for which the current cell arrival 6a or 6b belongs to a newly received packet, this particular situation therefore relates to the reception of a packet consisting of only a single cell. For this reason, the discard state machine 52 does not change the value of the packet activity indication 46 ("$PA_i$"), which remains at its default value of zero. In Example (h), the same situation as in Example (g) ensues, with the exception that the packet activity indication 46 ("$PA_i$") has a value of 1 instead of zero. In this situation, the discard state machine 52 returns a value to the effect that the current cell arrival 6a or 6b is to be discarded and is not to be passed. The discard state machine 52 proceeds to change each of the values of the discard state indication 36A ("$D_i$'") and of the packet activity indication 46 ("$PA_i$") of discard state table 300, as shown by the values $D_i$' (New) and $PA_i$ (New) in Table "B", which each are changed to a value of zero. This signifies that in the context of a condition of no congestion and where an end-of-packet detection is made, current cell arrivals 6a or 6b will continue to be discarded where they form part of an actively transmitting packet whose previously received cells were likewise subjected to discard. Given the end-of-packet detection in this example and the context of no congestion, each of the discard state indication 36A ("$D_i'$") and packet activity indication 46 ("$PA_i$") are reset to a default value of zero.

In each of Examples (i) through (l) of Table "B", there is presented the circumstance of a condition of congestion in respect of queue 10 with no end-of-packet detection. The situations of Examples (i) and (j) each deal with the discard state indication 36A ("$D_i'$") having a value of zero. In the case of Example (i), the packet activity indication 46 ("$PA_i$") has a value of zero. In this context, the discard state machine 52 returns a value to the effect that the current cell arrival 6a or 6b is to be discarded and is not to be passed. The discard state machine 52 then proceeds to change the values of the discard state indication 36A ("$D_i'$") and of the packet activity indication 46 ("$PA_i$") of the discard state table 300, as shown by the respective values $D_i'$ (New) and $PA_i$ (New) in Table "B", which are each changed to a value of 1. This denotes that in the context of a condition of congestion, a current cell arrival 6a or 6b that belongs to a newly received packet will be subjected to discard. Given the reception of a newly received packet in the context of a condition of congestion, each of the values of the discard state indication 36A ("$D_i'$") and packet activity indication 46 ("$PA_i$") are set to a value of 1. The case of Example (j) is similar to that of Example (i), with the difference that the packet activity indication 46 ("$PA_i$") has a value of 1. In this situation, the discard state machine 52 returns a value to the effect that the current cell arrival 6a or 6b is to be passed and is not to be discarded. The discard state machine 52 does not change the values of the discard state indication 36A ("$D_i'$") and the packet activity indication 46 ("$PA_i$") of the discard state table 300 as shown by the values $D_i'$ (New) and $PA_i$ (New) in Table "B", which each remain at the respective values of zero and 1. This denotes that in the context of a condition of congestion, a current cell arrival 6a or 6b that belongs to an actively transmitting packet will be passed if previously received cells 6a or 6b were not subjected to discard. Given that no end-of-packet detection is made and given that previously received cells 6a and 6b have already been passed, the discard state indication 36A ("$D_i'$") is left unchanged as is the packet activity indication 46 ("$PA_i$") so that constituent cells 6a or 6b of the same packet are likewise sought to be passed when same are received.

Examples (k) and (l) have the same corresponding parameters as the respective Examples (i) and (j), with the exception that the discard state indication 36A ("$D_i'$") has a value of 1 instead of zero. In the case of Example (k), the packet activity indication 46 has a value of zero, with a result that the discard state machine 52 will return a value to the effect that the current cell arrival 6a or 6b is to be discarded and is not to be passed. The discard state machine 52 does not change the value of the discard state indication 36A ("$D_i'$") of discard state table 300, as shown by the value $D_i'$ (New) in Table "B", which remains at a value of 1. However, the discard state machine 52 proceeds to change the value of the packet activity indication 46 ("$PA_i$") of the discard state table 300, as shown by the value of $PA_i$ (New) in Table "B", which is changed to a value of 1. This signifies that in the context of a condition of congestion and absent an end-of-packet detection, a current cell arrival 6a or 6b which belongs to a newly received packet will be subjected to discard where previous cell arrivals were likewise subjected to discard. Given the reception of a newly received packet in a condition of congestion, the values of the discard state indication 36A ("$D_i'$") and packet activity indication 46 ("$PA_i$") are left unchanged at a value of 1 and changed to a value of 1, respectively. In the case of Example (l), the corresponding parameters are the same as those in Example (k), with the exception that the packet activity indication 46 ("$PA_i$") has a value of 1 instead of zero. In this situation, the discard state machine 52 returns the value to the effect that the current cell arrival 6a or 6b is to be discarded and is not to be passed. The discard state machine 52 does not change the values of the discard state indication 36A ("$D_i'$") nor of the packet activity indication 46 ("$PA_i$") of the discard state table 300, as shown by the respective values $D_i'$ (New) and $PA_i$ (New) in Table "B", which each remain at a value of 1. This signifies that in the context of congestion and absent an end-of-packet detection, a current cell arrival 6a or 6b which belongs to an already transmitting packet will be subjected to discard where previous cell arrivals of the same packet were likewise subjected to discard.

Examples (m) through (p) relate to the situation where there is a condition of congestion in respect of queue 10 and an end-of-packet detection has been made. In the Examples (m) and (n), the discard state indication 36A ("$D_i'$") has a value of zero. In the case of Example (m), the packet activity indication 46 ("$PA_i$") also has a value of zero. In this situation, the discard state machine 52 returns a value to the effect that the current cell arrival 6a or 6b is to be discarded and is not to be passed. The discard state machine 52 then proceeds to change the value of the discard state indication 36A ("$D_i'$") of discard state table 300, as shown by the value of $D_i$ (New) in Table "B", which has changed to a value of 1. However, the discard state machine 52 does not change the value of the packet activity indication 46 ("$PA_i$") of discard state table 300, as shown by the value $PA_i$ (New) in Table "B", which remains at a value of zero. This denotes that in the context of a condition of congestion and with the detection of an end-of-packet, a current cell arrival 6a or 6b that belongs to a newly received packet will be discarded even though previously received cells 6a or 6b that did not belong to the same packet were previously not subjected to discard. The value of the discard state indication 36A ("$D_i'$") is changed in this situation to notify that the current cell arrival 6a or 6b was subjected to discard. Given that Example (m) speaks to a situation of an end-of-packet detection, and for which the current cell arrival 6a or 6b belongs to a newly transmitting packet, this particular situation therefore relates to the reception of a packet consisting of only a single cell. For this reason, packet activity indication 46 ("$PA_i$") is reset to its default value of zero. Example (n) has the same corresponding parameters as those found in Example (m), with the exception that the packet activity indication 46 ("$PA_i$") has a value of 1 instead of zero. In this situation, the discard state machine 52 returns a value to the effect that the current cell arrival 6a or 6b is to be passed and is not to be discarded. The discard state machine 52 then proceeds to change the existing values of the discard state indication 36A ("$D_i'$") and of the packet activity indication 46 ("$PA_i$") of the discard state table 300, as shown by the values of $D_i$ (New) and $PA_i$ (New) in Table "B", which are respectively changed to values of 1 and zero. This denotes that in the context of a condition of congestion and upon an end-of-packet detection, a current cell arrival 6a or 6b that belongs to an already transmitting packet will be permitted to pass where previous constituent cells 6a or 6b of that same packet were not subjected to discard. Given that an end-of-packet detection is made in Example (n), the packet activity indication 46 ("$PA_i$") is reset to its default value of zero.

With reference to Examples (o) and (p), these relate to the situation in which a condition of congestion exists in respect of queue 10, an end-of-packet detection is made and the discard state indication 36A ("$D_i'$") has a value of 1. In the case of Example (o), the packet activity indication 46 ("$PA_i$") has a value of zero. In this situation, the discard state machine 52 returns a value to the effect that the current cell arrival 6a or 6b is to be discarded and is not to be passed. The discard state machine 52 does not change the values of the discard state indication 36A ("$D_i'$") nor of the packet activity indication 46 ("$PA_i$") of discard state table 300, as shown by the values $D_i'$ (New) and $PA_i$ (New) in Table "B", which remain at their respective values of 1 and zero. This denotes that in the context of a condition of congestion and upon an end-of-packet detection, a current cell arrival 6a or 6b that belongs to a newly received packet will be discarded. In Example (p), the corresponding parameters are the same as those of Example (o), with the exception that the packet activity indication 46 ("$PA_i$") is set to a value of 1 instead of zero. In this situation, the discard state machine 52 returns a value to the effect of the current cell arrival 6a or 6b is to be discarded and is not to be passed. The discard state machine 52 does not change the value of the discard state indication 36A ("$D_i$") of the discard state table 300, as shown by the value $D_i'$ (New) in Table "B", which remains at a value of 1. However, the discard state machine 52 proceeds to change the value of the packet activity indication 46 ("$PA_i$") of the discard state table 300, as shown by the value of $PA_i$ (New) in Table "B", which has changed to a value of zero. This signifies that in the context of a condition of congestion and upon an end-of-packet detection, a current cell arrival 6a or 6b that belongs to a packet which was previously received and for which constituent cells have been subjected to discard will likewise be discarded. Given the end-of-packet detection in Example (p), the packet activity indication 46 ("$PA_i$") is reset to a default value of zero.

Although what has been described above in relation to the end-of-message indication 34 ("$EOM_i$") is in terms of an end-of-packet detection, those skilled in this art will appreciate that the present invention may be adapted to any delineation between successive segmented messages of a constituent message traffic stream of aggregated message traffic. Thus, instead of employing an end-of-packet detection as previously described, the present invention may likewise be adapted to the detection of a start of packet. Those skilled in this art will understand that various other modifications of detail may be made to the present invention, all of which would fall within its spirit and scope.

The invention claimed is:

1. A method of message discard for segmented message traffic in an aggregated message traffic stream of a communications network, the aggregated message traffic stream comprising a plurality of constituent message traffic streams thereof, each constituent message traffic stream having segmented message traffic which comprises segmented messages composed of formative segmented message units thereof, the said method comprising the steps of:
    (a) maintaining, for each said constituent message traffic stream, an indication of whether a currently received segmented message unit of each said constituent message traffic stream is to be subjected to message discard;
    (b) determining, upon each arrival of a segmented message unit of the aggregated message traffic stream, whether a currently received segmented message unit of the constituent message traffic stream denotes a delineation between two segmented messages thereof;
    (c) determining whether a current condition of traffic congestion exists as to the aggregated message traffic stream; and
    (d) utilizing the indication of step (a), the determination of step (b) and the determination of step (c) in determining whether a next to be received segmented message unit of the constituent message traffic stream is to be subjected to message discard.

2. The method according to claim 1, wherein the determination of whether the next to be received segmented message unit of the said constituent traffic stream is to be subjected to message discard is represented by at least one parameter that is stored as the indication of the said step (a) prior to arrival of the next to be received segmented message unit of the constituent message traffic system.

3. The method according to claim 2, wherein the indication of step (a) is numerically represented by a single bit value.

4. The method according to claim 3, wherein the indication of step (a) has a value of zero to denote that the currently received segmented message unit is not to be subjected to message discard and a value of 1 to denote that the currently received segmented message unit is to be subjected to message discard.

5. The method according to claim 1, wherein the determination of whether the next to be received segmented message unit of the said constituent traffic stream is to be subjected to message discard is arrived at on the basis of whether the currently received segmented message unit of the same said constituent traffic stream is subjected to anyone of:
    (i) message discard in a context of traffic congestion;
    (ii) message discard in a context of no traffic congestion but where the currently received segmented message unit is comprised in a segmented message that has not completed its transmission; and
    (iii) no message discard in a context of traffic congestion but where the currently received segmented message unit is comprised in a segmented message that has completed its transmission.

6. The method according to claim 5, wherein the indication of step (a) is numerically represented by two bits.

7. The method according to claim 6, wherein one of the two bits of the indication of step (a) denotes that the currently received segmented message unit is comprised in a segmented message that has previously commenced its transmission.

8. The method according to claim 7, wherein the aggregated message traffic stream is a virtual path and the constituent message traffic streams thereof are virtual connections.

9. The method according to claim 8, wherein the communications network is an Asynchronous Transfer Mode ("ATM") network.

10. The method according to claim 9, wherein the segmented messages are ATM Adaptation Layer ("AAL") packets and the segmented message units are AAL cells.

11. The method according to claim 10, wherein the AAL packets are AAL5 packets and the AAL cells are AAL5 cells.

12. The method according to claim 11, wherein the said delineation between two segmented messages of the constituent message traffic stream is an end of message indicator.

13. An apparatus for message discard of segmented message traffic in an aggregated message traffic stream of a communications network, the aggregated message traffic stream comprising a plurality of constituent message traffic streams thereof, each constituent message traffic stream having segmented message traffic which comprises segmented messages composed of formative segmented message units thereof, the said apparatus comprising:
  (a) a memory for storing, for each constituent message traffic stream, an indication of whether a currently received segmented message unit of each said constituent message traffic stream is to be subjected to message discard;
  (b) a reader for detecting, upon each arrival of a segmented message unit of the constituent message traffic stream, whether a currently received message unit of the constituent message traffic stream denotes a delineation between two segmented messages thereof; and
  (c) a processor for determining whether a next to be received segmented message unit of the constituent message traffic stream is to be subjected to message discard, wherein to arrive at the said determination of whether said next to be received segmented message unit is to be subjected to message discard, the processor utilizes the said indication of whether said currently received segmented message unit is to be subjected to message discard, the said detection of whether the said currently received segmented message unit denotes a delineation between said two segmented messages, and a determination of whether a current condition of traffic congestion exists as to the aggregated message traffic stream.

14. The apparatus according to claim 13, wherein the memory further stores the detection of whether said currently received message unit denotes said delineation between said two segmented messages and the determination of whether said current condition of traffic congestion exists as to the aggregated traffic stream.

15. The apparatus according to claim 14, wherein the determination of whether the next to be received message unit of the said constituent traffic stream is to be subjected to discard is represented by at least one parameter that is stored in said memory as the indication of whether said currently received segmented message unit is to be subjected to message discard, said parameter being stored prior to arrival of said next to be received segmented message unit.

16. The apparatus according to claim 15, wherein the indication of whether said currently received segmented message unit is to be subjected to discard is numerically represented by a single bit value.

17. The apparatus according to claim 16, wherein the indication of whether said currently received segmented message unit is to be subjected to discard has a value of zero to denote that the currently received segmented message unit is not to be subjected to message discard and a value of 1 to denote that the currently received segmented message unit is to be subjected to message discard.

18. The apparatus according to claim 13, wherein the determination of whether the next to be received segmented message unit of the said constituent traffic stream is to be subjected to message discard is arrived at on the basis of whether the currently received segmented message unit of the same said constituent traffic stream is subjected to any one of:
  (i) message discard in a context of traffic congestion;
  (ii) message discard in a context of no traffic congestion but where the currently received segmented message unit is comprised in a segmented message that has not completed its transmission; and
  (iii) no message discard in a context of traffic congestion but where the currently received segmented message unit is comprised in a segmented message that has completed its transmission.

19. The apparatus according to claim 18, wherein the indication of whether said currently received segmented message unit is to be subjected to discard is numerically represented by two bits.

20. The apparatus according to claim 19, wherein one of the two bits of the indication of whether said currently received segmented message unit is to be subjected to discard denotes that the currently received segmented message unit is comprised in a segmented message that has previously commenced its transmission.

21. The apparatus according to claim 20, wherein the aggregated message traffic stream is a virtual path and the constituent message traffic streams thereof are virtual connections.

\* \* \* \* \*